(12) United States Patent
Hasegawa (10) Patent No.: US 12,438,611 B2
(45) Date of Patent: Oct. 7, 2025

(54) SWITCHING DEVICE AND SWITCHING METHOD

(71) Applicant: NEC Corporation, Tokyo (JP)

(72) Inventor: Yohei Hasegawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 291 days.

(21) Appl. No.: 18/120,629

(22) Filed: Mar. 13, 2023

(65) Prior Publication Data

US 2023/0379052 A1    Nov. 23, 2023

(30) Foreign Application Priority Data

May 19, 2022   (JP) .................. 2022-082192

(51) Int. Cl.
*H04B 10/073* (2013.01)
*H04B 10/077* (2013.01)
*H04Q 11/00* (2006.01)

(52) U.S. Cl.
CPC ..... *H04B 10/0775* (2013.01); *H04Q 11/0005* (2013.01)

(58) Field of Classification Search
CPC .................................... H04B 10/0775
See application file for complete search history.

(56) References Cited

U.S. PATENT DOCUMENTS

2005/0063497 A1\* 3/2005 Mahlab ............. H04B 10/0775
                                                               375/346
2019/0379461 A1\* 12/2019 Irie ..................... H04B 10/572

FOREIGN PATENT DOCUMENTS

JP    2014-107823 A    6/2014

\* cited by examiner

*Primary Examiner* — Shi K Li
(74) *Attorney, Agent, or Firm* — Sughrue Mion, PLLC (57) ABSTRACT

A switching device includes an optical communication unit configured to receive an optical communication signal; and a control unit configured to switch a path for the optical communication unit to receive an optical communication signal based on at least one of reception power of the optical communication signal received by the optical communication unit, an error rate of a synchronous signal therefor, an error rate after signal demodulation thereof, an error rate after error correction decoding thereof, and an SN (Signal-to-Noise) ratio of the path for the optical communication signal.

6 Claims, 9 Drawing Sheets

Fig. 9

SWITCHING DEVICE AND SWITCHING METHOD

INCORPORATION BY REFERENCE

This application is based upon and claims the benefit of priority from Japanese patent application No. 2022-082192, filed on May 19, 2022, the disclosure of which is incorporated herein in its entirety by reference.

TECHNICAL FIELD

The present disclosure relates to a switching device and a switching method.

BACKGROUND ART

Communication traffic volume has been increasing at an annual rate of 30% or higher for the past 30 years, and there has thus been a demand for large-scale and high-capacity networks for the Internet, mobile networks, and communication between data centers, and the like. The evolution of optical communication devices is also remarkable, and in recent years, the number of choices for high-speed optical communication device products has been increasing. For example, products in which advanced signal processing, such as higher-order QAM (QAM: Quadrature Amplitude Modulation, e.g., 64 QAM and 256 QAM) used in high-speed communication for backbone networks, is implemented in compact interface modules (e.g., CFP modules) have been developed. For example, the development of products that are equipped with DSPs (Digital Signal Processors) for carrying out advanced signal processing and thereby realizing long-distance communication of 2,000 km has been announced.

In relation to this technology, Japanese Unexamined Patent Application Publication No. 2014-107823 discloses a technology for switching an optical transmission path from one in which a problem has occurred to another one in which the problem is not occurring.

SUMMARY

However, in the related technology, there is a problem that there are cases where, for example, an optical communication path cannot be appropriately switched according to the quality of optical communication performed thereon.

In view of the above-described problem, an object of the present disclosure is to provide a technology for enabling an optical communication path to be appropriately switched.

In a first aspect of the present disclosure, the following switching device is provided. That is, the switching device includes:
an optical communication unit configured to receive an optical communication signal; and a control unit configured to switch a path for the optical communication unit to receive an optical communication signal based on at least one of reception power of the optical communication signal received by the optical communication unit, an error rate of a synchronous signal therefor, an error rate after signal demodulation thereof, an error rate after error correction decoding thereof, and an SN (Signal-to-Noise) ratio of the path for the optical communication signal.

Further, in a second aspect of the present disclosure, the following switching method is provided. That is, the switching method includes:
receiving an optical communication signal; and switching a path for receiving an optical communication signal based on at least one of reception power of the received optical communication signal, an error rate of a synchronous signal therefor, an error rate after signal demodulation thereof, an error rate after error correction decoding thereof, and an SN (Signal-to-Noise) ratio of the path for the optical communication signal.

BRIEF DESCRIPTION OF DRAWINGS

The above and other aspects, features, and advantages of the present disclosure will become more apparent from the following description of certain example embodiments when taken in conjunction with the accompanying drawings, in which.

EXAMPLE EMBODIMENT

The principle of the present disclosure will be described with reference to several illustrative example embodiments. It should be understood that these example embodiments are described only for an illustrative purpose and will assist those skilled in the art in understanding and carrying out the present disclosure without suggesting any limitations in regard to the scope of the disclosure. Disclosures described in this specification can also be implemented in a variety of ways other than those described below.

In the following description and the claims, unless otherwise defined, all technical and scientific terms used in this specification have the same meanings as those generally understood by those skilled in the technical field to which the present disclosure belongs.

An example embodiment according to the present disclosure will be described hereinafter with reference to the drawings.

First Example Embodiment

<Configuration>

Figure 1:
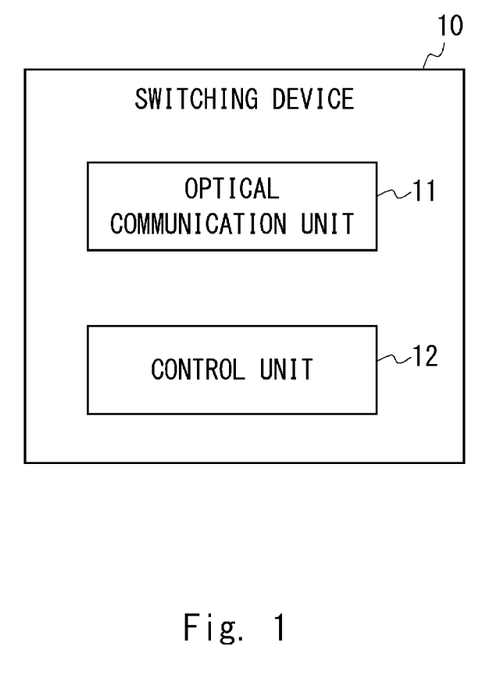
FIG. 1 shows an example of a configuration of a switching device according to an example embodiment.

A configuration of a switching device 10 according to an example embodiment will be described with reference to FIG. 1. FIG. 1 shows an example of the configuration of the switching device 10 according to the example embodiment. The switching device 10 includes an optical communication unit 11, and a control unit 12. The optical communication unit 11 receives an optical communication signal. When the quality of the optical communication signal is equal to or lower than a threshold, the control unit 12 switches the path for receiving an optical communication signal. For example, the control unit 12 may switch the path for the optical communication unit 11 to receive an optical communication signal based on at least one of reception power of the optical communication signal received by the optical communication unit 11, an error rate of a synchronous signal therefor, an error rate after signal demodulation thereof, an error rate after error correction decoding thereof, and an SN (Signal-to-Noise) ratio of the path for the optical communication signal.

Second Example Embodiment

Next, a configuration of an optical communication system 1 according to an example embodiment will be described with reference to FIG. 2.

<System Configuration>

Figure 2:
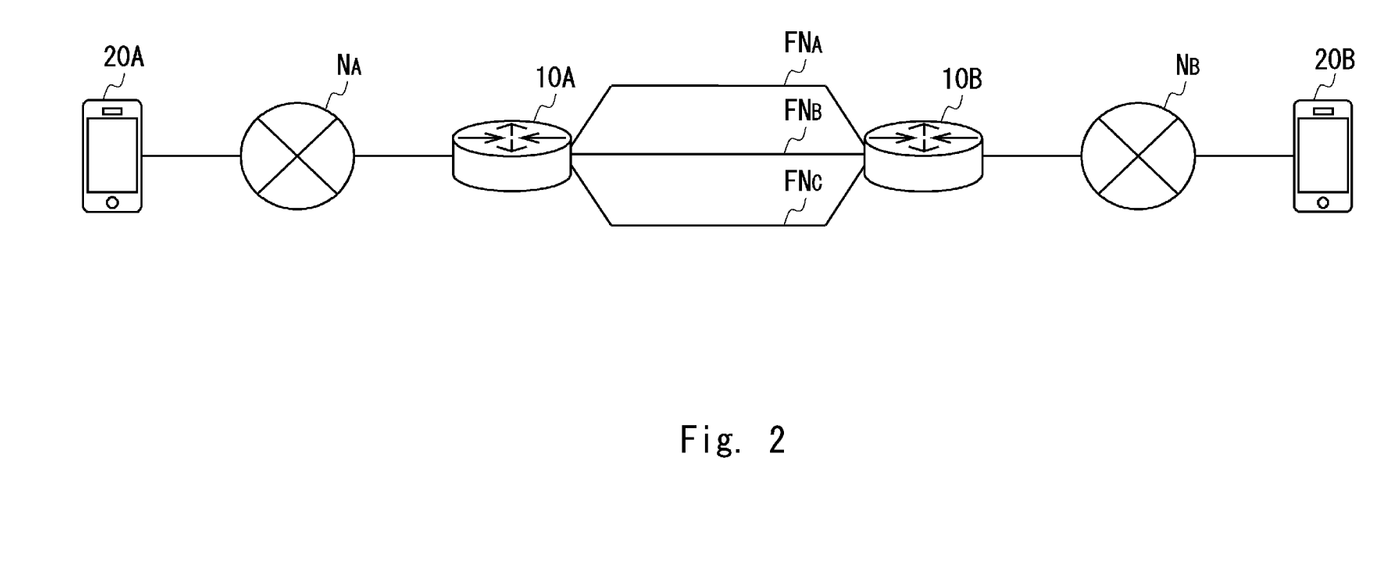
FIG. 2 shows an example of a configuration of an optical communication system according to an example embodiment.

FIG. 2 shows an example of the configuration of the optical communication system 1 according to the example embodiment. In the example shown in FIG. 2, the optical communication system 1 includes a switching device 10A, a switching device 10B (in the following description, when they do not need to be distinguished from each other, they are also referred to simply as the "switching device(s) 10"). Further, the optical communication system 1 includes a user host 20A, a user host 20B (in the following description, when they do not need to be distinguished from each other, they are also referred to simply as the "user host(s) 20"). Note that the number of switching devices 10 and the number of user hosts 20 are not limited to the examples shown in FIG. 2.

The switching device 10A and the user host 20A are connected to each other so that they can communicate with each other through a network $N_A$. Further, the switching device 10B and the user host 20B are connected to each other so that they can communicate with each other through a network $N_B$.

Examples of each of the networks $N_A$ and $N_B$ (in the following description, when they do not need to be distinguished from each other, they are also referred to simply as the "Network(s) N") include the Internet, a LAN (Local Area Network), a mobile communication system, a wireless LAN, and a bus. Examples of the mobile communication system include a 5th-generation mobile communication system (5G), a 6th-generation mobile communication system (6G, Beyond 5G), a 4th-generation mobile communication system (4G), and a 3rd-generation mobile communication system (3G).

Further, the switching devices 10A and 10B are connected to each other in such a manner that they can communicate to each other through any of an optical network $FN_A$, an optical network $FN_B$, and an optical network $FN_C$ (in the following description, when they do not need to be distinguished from each other, they are also referred to simply as the "optical network(s) FN"). The optical network FN is a network through which optical communication is performed, and an optical fiber or the like may be used as its transmission path. Note that the number of optical network FNs is not limited to the example shown in FIG. 2.

The switching device 10 is a termination point of an optical communication path through the optical network FN through which optical signals propagate, and forms a communication link with other switching devices 10 in which optical communication signals are synchronized. The switching device 10 converts a communication packet, which is an electrical signal, received from the user host 20 into an optical signal, and outputs the obtained optical signal to an optical network FN (an output interface, a link) that is determined according to a destination specified in the communication packet. Further, the switching device 10 converts an optical signal received from other switching devices 10 into a communication packet, which is an electrical signal, and outputs the obtained communication packet to the network N.

The switching device 10 may measure reception power upon receiving an optical communication signal, an error rate (Clock ER: Clock Error Ratio) of a synchronous signal, an error rate after QAM decoding (hereafter also referred to as "Pre-FEC BER (Bit Error Rate)" as appropriate), an error rate after FEC (Forward Error Correction) decoding (hereafter also referred to as "Post-FEC BER" as appropriate), and the like. Note that the Pre-FEC BER is an example of the "error rate after signal demodulation". Further, the Post-FEC BER is an example of the "error rate after error correction decoding".

The switching device 10 may perform communication by using a link included in an active link group A including an arbitrary number of active links among links registered in a group L including a link group ($l_0, \ldots l_{n-1}$) through which the switching device 10 can reach one other switching device 10 set in advance. Note that, for example, the control unit 12 of the switching device 10 may use, as a method for determining which link it should output a given packet from, a round-robin scheme in which the control unit 12 uses a link included in the link group A in turn every time it transmits a packet.

Further, when it is determined that a deterioration of communication quality (e.g., a communication failure) has occurred on a given link, the switching device 10 may stop the use of that link. Then, when it is determined that the deterioration of communication quality on the link has been solved, the switching device 10 may resume the use of the link.

The user host 20 performs packet communication through a network. The user host 20 may be, for example, a terminal such as a personal computer, a smartphone, or a tablet-type computer.

<Processing>

<<Quality Deterioration Detection Process>>

Figure 3:
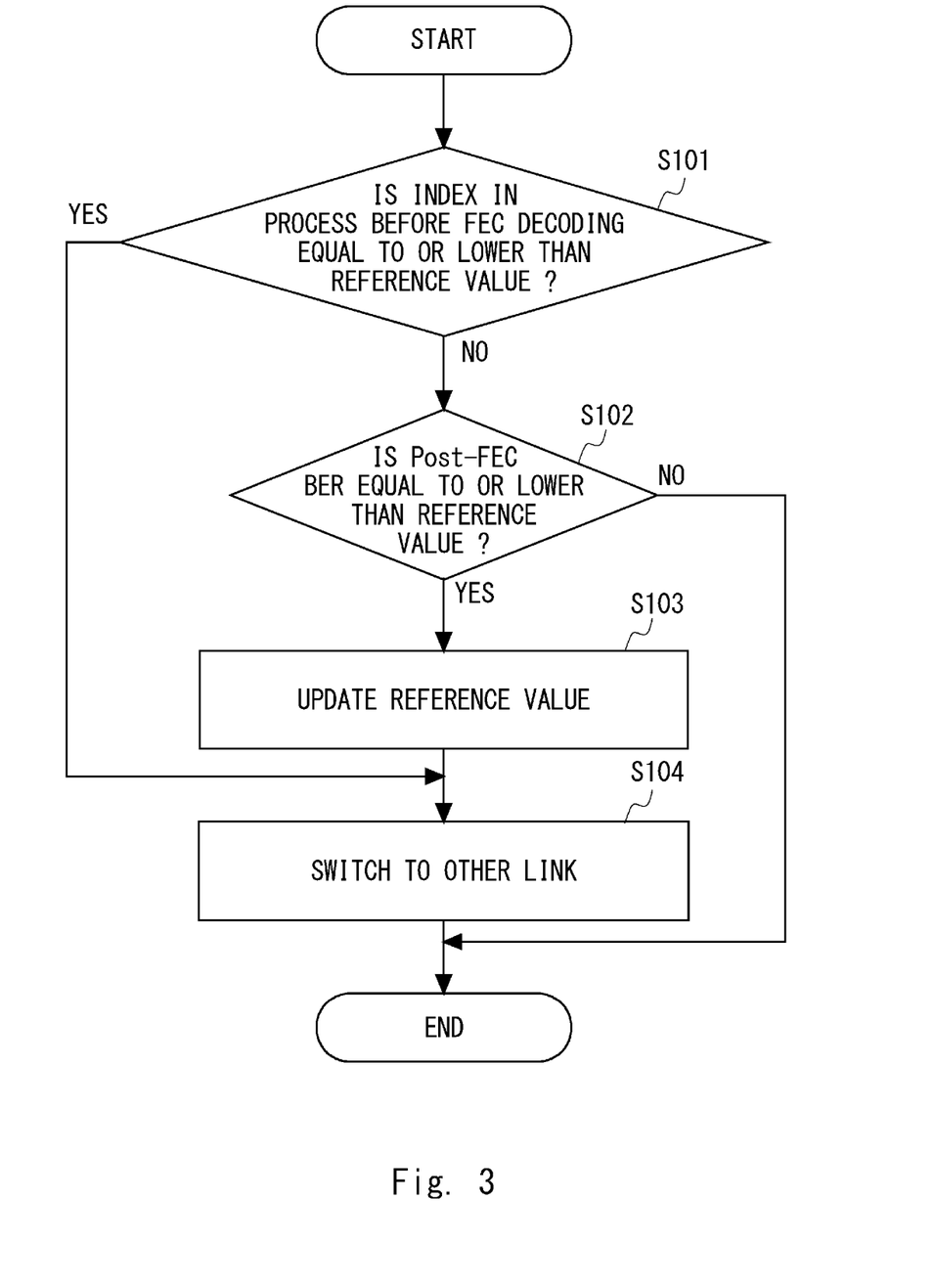
FIG. 3 is a flowchart showing an example of processes through which a switching device according to an example embodiment detects that the communication quality of an optical network has deteriorated.

Next, an example of processes through which the switching device 10 according to the example embodiment detects that the communication quality of the optical network FN has deteriorated will be described with reference to FIG. 3. FIG. 3 is a flowchart showing an example of processes through which the switching device 10 according to the example embodiment detects that the communication quality of the optical network FN has deteriorated. The switching device 10 may, for example, perform the processes shown in FIG. 3 (a quality deterioration detection process) at periodical timings, or when at least one index related to the communication quality of the optical network FN has changed.

In a step S101, the control unit 12 determines whether or not the communication quality of a link $l_m$ is equal to or lower than a reference value based on each of indices used in processes performed before an optical communication signal having a specific frequency received through the link $l_m$ is FEC-decoded.

Note that the control unit 12 may determine that the quality is equal to or lower than the reference value when, for example, power (reception power) $S_j$ of a received optical communication signal having a specific frequency is equal to or lower than a reference value $S_{min}$ for the reception power, or when a value equal to or lower than the reference value $S_{min}$ is included in a history of reception power $(S_i, \ldots S_j)$. Note that the history may be, for example, measurement results that have been obtained from the last process to the current process.

Alternatively or additionally, the control unit 12 may determine that the quality is equal to or lower than the reference value, for example, when an error rate (Clock ER: Clock Error Ratio) $K_j$ of a communication signal synchronized with a specific frequency is equal to or higher than a reference value $K_{max}$ for the synchronous signal error rate, or when a value equal to or higher than the reference value $K_{max}$ is included in a history of synchronous signal error rates $(K_i, \ldots K_j)$.

Further, the control unit 12 may determine that the quality is equal to or lower than the reference value, for example, when an error rate $P_{mod,j}$ (Pre-FEC BER) of a communication signal decoded (e.g., QAM-decoded) is equal to or higher than a reference value $P_{mod\_max}$ for the error rate after the signal demodulation, or when a value equal to or higher than the reference value $P_{mod\_max}$ is included in a history of the error rates $(P_{mod,i}, \ldots P_{mod,j})$.

When the quality is equal to or lower than the reference value (Yes in Step S101), the process proceeds to a step S104. In this way, it is possible to perform switching quickly as compared with, for example, a case where the determination is made at a time point after the FEC decoding (e.g., when the link is not established).

On the other hand, when the quality is not equal to nor lower than the reference value (No in Step S101), the control unit 12 determines whether or not the communication quality of the link $l_m$ is equal to or lower than the reference value based on the Post-FEC BER (Step S102). Note that the control unit 12 may determine that the quality is equal to or lower than the reference value, for example, when an error rate $P_{fec,j}$ (Post-FEC BER) of the communication signal that has been decoded (e.g., QAM-decoded) and FEC-decoded is equal to or higher than a reference value $P_{fec\_max}$ for the error rate after the error correction decoding, or when a value equal to or higher than the reference value $P_{fec\_max}$ is included in a history of the error rates $(P_{fec,i}, \ldots P_{fec,j})$.

When the quality determined based on the Post-FEC BER is not equal to nor lower than the reference value (No in Step S102), the quality deterioration detection process is finished. On the other hand, when the quality determined based on the Post-FEC BER is equal to or lower than the reference value (Yes in Step S102), the control unit 12 updates each of the reference values used to determine the communication quality of the link $l_m$ (Step S103). Note that the control unit 12 may update the reference values, for example, by the below-shown Expressions (1) to (3), respectively. Note that $S_{min}'$, $P_{mod\_max}'$ and $P_{fec\_max}'$ are values of the reference value $S_{min}$ for the reception power, the reference value $P_{mod\_max}$ for the error rate after the signal demodulation, and the reference value $P_{fec\_max}$ for the error rate after the error correction decoding, respectively, which have been updated and will be used from the next determination processes.

$$S_{min}'=\max(S_{min}, S_j) \qquad (1)$$

$$P_{mod\_max}'=\min(P_{mod\_max}, P_{mod,j}) \qquad (2)$$

$$P_{fec\_max}'=\min(P_{fec\_max}, P_{fec,j}) \qquad (3)$$

In this way, for example, when the Post-FEC BER has deteriorated (e.g., when a communication failure has occurred), it is possible to use the measurement result of each of the indices used in processes performed before the FEC as a reference value for a value indicating a possibility that the Post-FEC BER will deteriorate.

Next, the control unit 12 switches the path for receiving an optical communication signal from the link $l_m$ to other links (Step S104). In this way, the optical communication path can be appropriately switched. Note that in order to economically achieve large-capacity communication in communication between data centers or the like, hetero-environments in which various optical communication devices desired by various users are connected have been becoming popular. When an optical network is formed by various optical communication devices because of increasing hetero-environments, it is desired to find out characteristics more speedily over a wider range even in optical communication which has been carried out after characteristics are carefully checked in the past. Further, even in an optical network of which characteristics are unknown, high reliability is required as in the past. According to the technology in accordance with the present disclosure, it is possible to, for example, improve the reliability of a packet network even in an optical network of which characteristics are unknown.

Note that the control unit 12 may, for example, delete the link $l_m$ from the active link group A. In this case, the control unit 12 may, for example, transmit a message indicating a communication failure on the link $l_m$ to another switching device 10 with which its own switching device 10 is communicating. As a result, the link connected to the link $l_m$ is deleted from the active link group by the other switching device 10 that has received the message.

Note that the control unit 12 may determine a priority (a frequency of use) of each of the links included in the active link group A based on the communication quality of that link. In this case, the control unit 12 may, for example, determine a priority in such a manner that the lower the Post-FEC BER of a given link is, the higher priority it assigns to that link. In this way, for example, it is possible preferentially use a link having a low Post-FEC BER.

<<Quality Restoration Detection Process>>

Figure 4:
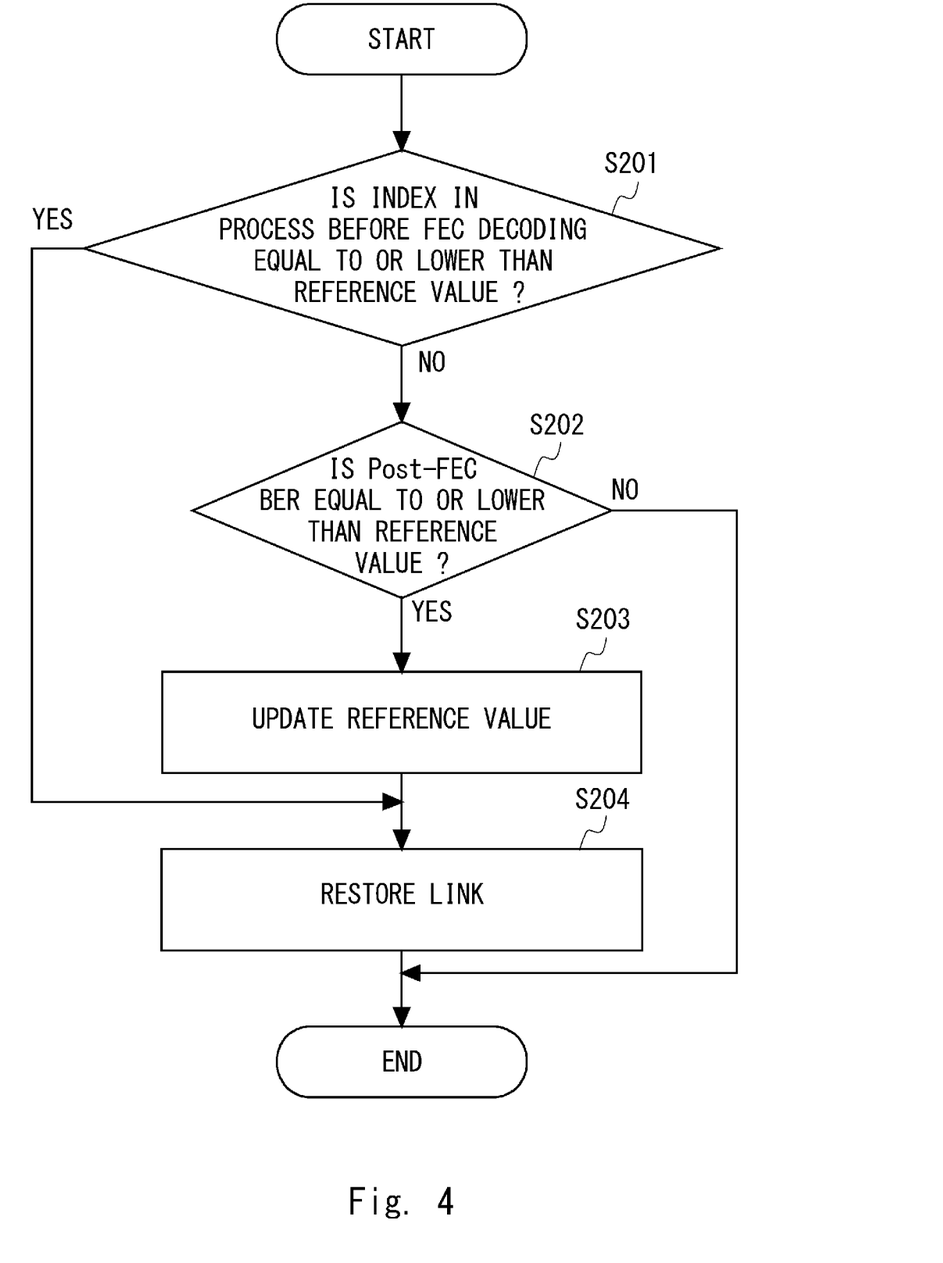
FIG. 4 is a flowchart showing an example of processes through which a switching device according to an example embodiment detects that the communication quality of an optical network has been restored.

Next, an example of processes through which the switching device 10 according to the example embodiment detects that the communication quality of the optical network FN has been restored will be described with reference to FIG. 4. FIG. 4 is a flowchart showing an example of processes through which the switching device 10 according to the example embodiment detects that the communication quality of the optical network FN has been restored. The switching device 10 may, for example, perform the processes shown in FIG. 4 (a quality deterioration detection process) at periodical timings, or when at least one index related to the communication quality of the optical network FN has changed.

In a step S201, the control unit 12 determines whether or not the communication quality of a link $l_m$ is equal to or lower than a reference value based on each of indices used in processes performed before an optical communication signal having a specific frequency received through the link $l_m$ is FEC-decoded. Note that the process in the step S201 may be similar to that in the step S101 in FIG. 3. In this case, the value of each of the reference values may be equal to that in the step S101 in FIG. 3. Alternatively, they may be different from those in the step S101. In this case, the reference values $S_{min}$, $P_{mod\_max}$, and $P_{fec\_max}$ in the quality deterioration detection process may be read as (or regarded as), for example, reference values $SR_{min}$, $PR_{mod\_max}$, $PR_{fec\_max}$, respectively.

When the quality is not equal to nor lower than the reference value (No in Step S201), the process proceeds to a step S204. On the other hand, when the quality is equal to or lower than the reference value (Yes in Step S201), the control unit 12 determines whether or not the communication quality of the link $l_m$ is equal to or lower than the reference value based on the Post-FEC BER, which is an index in the process performed after the FEC decoding (Step S202). Note that the control unit 12 may determine that the quality is equal to or lower than the reference value, for example, when an error rate $P_{fec,j}$ (Post-FEC BER) of the communication signal that has been decoded (e.g., QAM-decoded) and FEC-decoded (Forward Error Correction-decoded) is not equal to nor higher than the reference value $PR_{fec\_max}$, or when no value equal to or higher than the reference value $PR_{fec\_max}$ is included in the history of the error rates ($P_{fec,i}, \ldots P_{fec,j}$).

When the quality determined based on the Post-FEC BER is not equal to nor lower than the reference value (No in Step S202), the quality restoration detection process is finished. On the other hand, when the quality determined based on the Post-FEC BER is equal to or lower than the reference value (Yes in Step S202), the control unit 12 updates each of the reference values used to determine the communication quality of the link $l_m$ (Step S203). Note that the process in the step S203 may be similar to that in the step S103 in FIG. 3.

In this way, for example, when the Post-FEC BER is restored (e.g., when the communication failure has been fixed), it is possible to use the measurement result of each of the indices used in processes performed before the FEC as a reference value for a value indicating a possibility that the Post-FEC BER will deteriorate.

Next, the control unit 12 restores the link $l_m$ (Step S204). Note that the control unit 12 may, for example, add the link $l_m$ to the active link group A. In this case, the control unit 12 may, for example, transmit a message indicating the restoration of communication on the link $l_m$ to another switching device 10 with which its own switching device 10 is communicating. As a result, the link connected to the link $l_m$ is added to the active link group by the other switching device 10 that has received the message.

(Example of Process for Updating Reference Value)

In the above-described example, an example in which the reference value $S_{min}$ ($SR_{min}$) for the reception power is updated by the Expression (1) in the step S103 in FIG. 3 or the step S203 in FIG. 4 is described. As an alternative example of the above-described updating, the control unit 12 may update the reference value $S_{min}$ ($SR_{min}$) by estimating the noise level on the optical communication line during communication by using a relationship between the Post-FEC BER and the SN ratio in at least one of the step S103 in FIG. 3 and the step S203 in FIG. 4. In this way, for example, the reference value $S_{min}$ ($SR_{min}$) can be appropriately determined.

Note that the Post-FEC BER can be theoretically determined from the SN ratio of a communication signal, and can be simply expressed as the below-shown Expression 4.

$$P_{fec}=F(S/N) \quad (4)$$

For example, the Post-FEC BER according to ITU-T G. 709 Reed-Solomon (255, 239) is expressed by the below-shown Expression 5.

$$P_{fec}=1-(1-P_{UE})^{1/8} \quad (5)$$

In the expression, $P_{UE}$ is an error correction failure rate, and is expressed by the below-shown Expression 6.

$$P_{UE} = \sum_{i=9}^{N} \frac{i}{N} \times \binom{N}{i} \times P_{SE}^{i} \times (1-P_{SE})^{N-i} \quad (6)$$

$P_{SE}$ is an error rate of symbol data (Bytes), and is expressed by the below-shown Expression 7 by using an error rate $P_{mod}$ after QAM demodulation.

$$P_{SE}=P_{mod}/8 \quad (7)$$

The error rate after QAM demodulation is expressed by the below-shown Expression 8.

$$P_{MOD} = \frac{4}{k}\left(1-\frac{1}{\sqrt{M}}\right) \times \frac{1}{2}\text{erfc}\left(\sqrt{\frac{3k \times SNR}{M-1}}\right) \quad (8)$$

In the expression, M is a constellation order of the QAM, and k is a bit-length per symbol and expressed as the below-shown Expression 9.

$$k=\log_2 M \quad (9)$$

erfc is an error function and expressed by the below-shown Expression 10.

$$\text{erfc}(x)=2/\sqrt{2}\int_x^{\infty} e^{-t^2} dt \quad (10)$$

Figure 5:
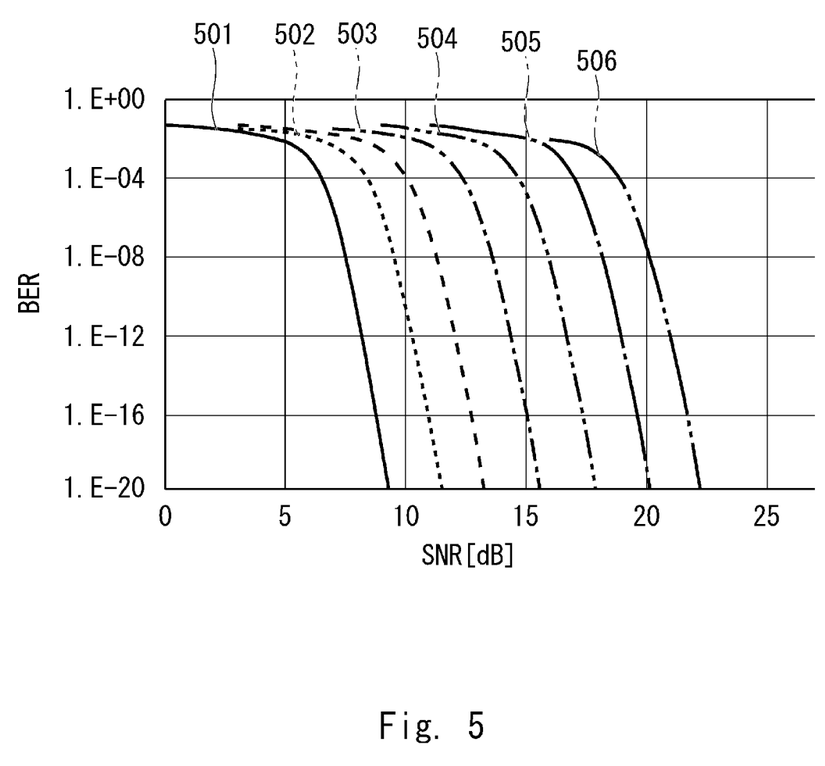
FIG. 5 shows an example of calculation results (a correspondence table) of a relationship between a Post-FEC BER and an SN ratio according to an example embodiment.

When the modulation method and the error correction coding method are known as described above, the control unit 12 can determine the Post-FEC BER from the SN ratio. Further, the control unit 12 may determine the Post-FEC BER from the SN ratio based on a predefined correspondence table between SN ratios and Post-FEC BERs. FIG. 5 shows an example of calculation results (a correspondence table) of a relationship between the Post-FEC BER and the SN ratio according to an example embodiment. FIG. 5 shows, when the vertical axis indicates the Post-FEC BER and the horizontal axis indicates the SN ratio (SNR), curves 501 to 506 for QAMs in which constellation orders are 4, 8, 16, 32, 64, 128 and 256, respectively.

As described above, when the relationship expressed by the Expression 4 is obtained, the noise N during communication is obtained as shown by the below-shown Expression (11).

$$N=S/F^{-1}(P_{fec}) \quad (11)$$

In the expression, $F^{-1}$ is the inverse function of F.

Then, by using the obtained noise N, the control unit 12 may next set the reference value $S_{min}$ for reception power in the step S101 in FIG. 3 as shown by the below-shown Expression 12.

$$S_{min}=N/F^{-1}(P_{fec\_max}) \quad (12)$$

Note that as shown in FIG. 5, it is possible to calculate the SN ratio that is required to carry out communication in which the error rate is equal to or lower than a specific value with QAMs in which a different communication speed is set for each of the constellation orders. Therefore, the expected transmission speed can also be calculated based on the estimated SN ratio of each of the links. Therefore, the control unit 12 may set, for each of the links, the maximum transmission speed that can be achieved with the SN ratio of that link.

Further, the control unit 12 may determine a priority of each of a plurality of links having different modulation methods (e.g., a plurality of links of which the constellation orders of the QAMs different from each other) based on the Post-FEC BER on that link. In this case, the control unit 12 may, for example, determine a priority (a frequency of use) of each of the links included in the active link group A based on the SN ratio of that link or the expected communication speed thereof. In this case, the control unit 12 may, for example, determine a priority of a link in such a manner that the better (higher) the SN ratio of a given link is, the higher priority it assigns to that link. In this way, for example, it is possible, during communication, to preferentially use a link of which the QAM has the maximum achievable communication speed.

<<Quality Deterioration Detection Process (Example in which Quality is Determined Based on Test Signal)>>

Figure 6:
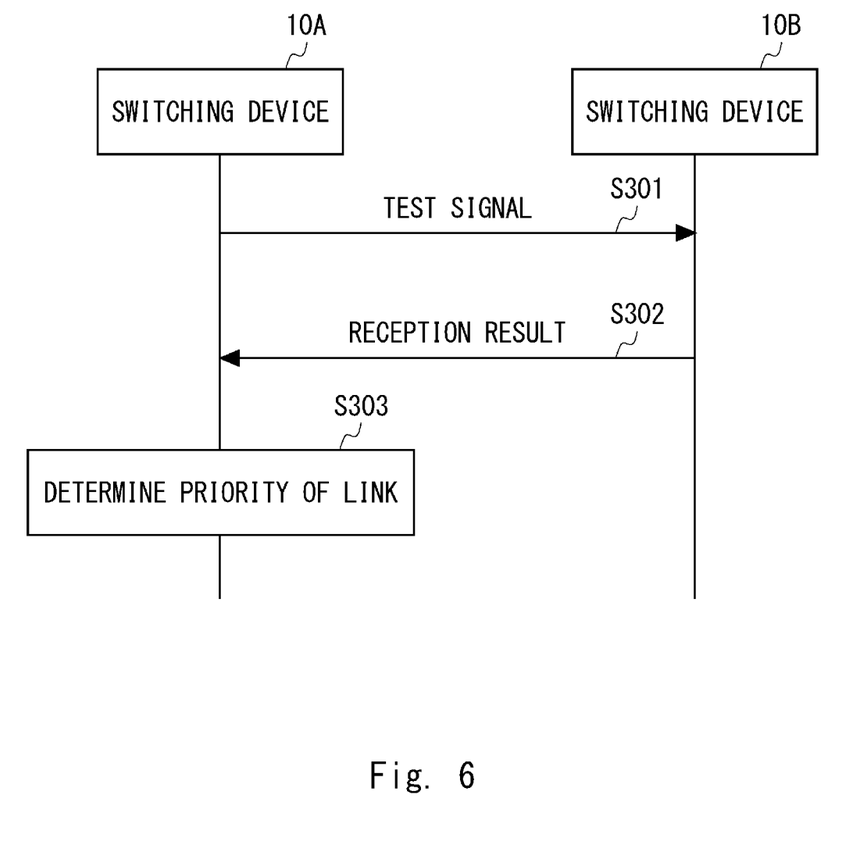
FIG. 6 is a flowchart showing an example of processes through which a switching device according to an example embodiment detects that the communication quality of an optical network has deteriorated.
Figure 7:
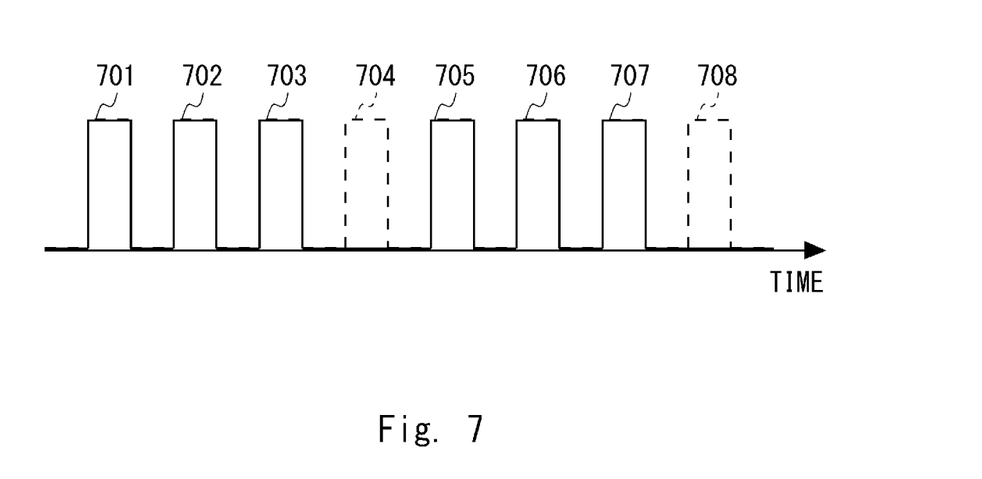
FIG. 7 shows an example of a test signal according to an example embodiment.
Figure 8:
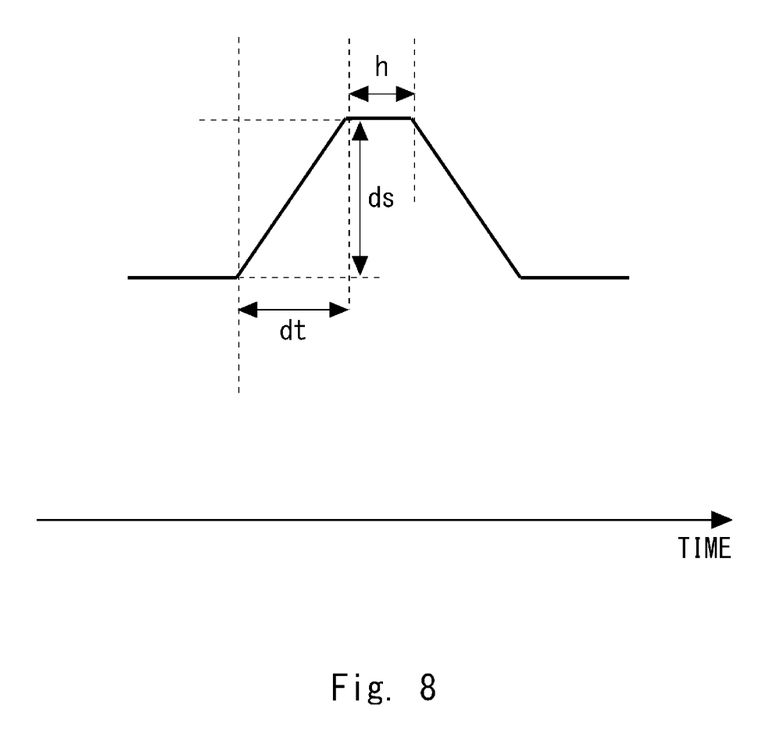
FIG. 8 shows an example of a test signal according to an example embodiment.

Next, an example in which quality is determined based on a test signal will be described with reference to FIGS. 6 to 8. FIG. 6 is a flowchart showing an example of processes through which a switching device 10 according to an example embodiment detects that the communication quality of an optical network FN has deteriorated. FIG. 7 shows an example of a test signal according to the example embodiment. FIG. 8 shows an example of a test signal according to the example embodiment.

Note that the switching device 10 can perform each of the processes shown in FIG. 6 while combining it with each of the processes shown in FIG. 3 as appropriate. The switching device 10 may, for example, perform the processes shown in FIG. 6 (a quality deterioration detection process) at periodical timings, or when at least one index related to the communication quality of the optical network FN has changed. An example in which the switching device 10A measures the quality of a link with switching device 10B will be described hereinafter.

In a step S301, the optical communication unit 11 of the switching device 10A transmits a test signal (a test pattern) to the switching device 10B through a given link $l_m$. Note that as the test signal, the optical communication unit 11 of the switching device 10A may transmit, a specific number of times, a cyclic signal (e.g., a signal including a plurality of cyclic pulses) in which parts of the signal (e.g., some of pulses of the signal) are missing at some cycles as shown in FIG. 7. In the example shown in FIG. 7, the following test signal is transmitted, i.e., in the test signal: after cyclic clock pulses 701, 702 and 703 are transmitted, a cyclic clock pulse 704 is missing; and after cyclic clock pulses 705, 706 and 707 are transmitted, a cyclic clock pulse 708 is missing.

Alternatively or additionally, the optical communication unit 11 of the switching device 10A may, after transmitting a test start signal containing information indicating the duration of the test and a measurement interval (a sampling interval), transmit, as a test signal, a signal of which the transmission power changes in a specific pattern as shown in FIG. 8. In the example shown in FIG. 8, the transmission power is increased by an amount ds over a time length dt, maintained for a certain time length, and decreased by an amount ds over a time length dt.

Next, the optical communication unit 11 of the switching device 10B returns (transmits) the result of the reception of the test signal to the switching device 10A (Step S302). Note that the optical communication unit 11 of the switching device 10B may transmit, as the result of the reception of the test signal, the number of times the clock pulse was missing during the period in which the switching device 10B has received, a specific number of times, the above-described cyclic signal in which parts (e.g., some of pulses) of the signal were missing as shown in FIG. 7.

Further, in the case where the optical communication unit 11 of the switching device 10B receives, as the test signal, a signal of which the transmission power changes in a specific pattern as shown in FIG. 8, the optical communication unit 11 may transmit, as the result of the reception of the test signal, a history of changes in the reception power measured at measurement intervals in a specified period (the duration of the test) that starts when the optical communication unit 11 receives the test start signal.

Next, the control unit 12 of the switching device 10A determines a priority of the link $l_m$ based on the result of the reception of the test signal received from the switching device 10B (Step S303). In this way, for example, it is possible to determine the priority of the link based on the accuracy of the detection (the reliability of the detection) of the deterioration of the quality and the swiftness of the detection of the deterioration of the quality, and thereby to improve the reliability of communication.

Note that when the number of times the reception of the clock was missing included in the result of the reception of the test signal shown in FIG. 7, which has been received from the switching device 10B, is correct, the control unit 12 of the switching device 10A may increase the priority of the link $l_m$. This is because in the link $l_m$, the optical communication signal is not decoded by the relay device (e.g., the other switching device 10) on the transmission line, so that it is considered that it is the link through which faulty transmission is not delayed. Further, the control unit 12 of the switching device 10A may decrease the priority of the link $l_m$ in such a manner that the larger the number of times the reception of the clock was missing included in the result of the reception of the test signal shown in FIG. 7, which has been received from the switching device 10B, is, the more the control unit 12 decreases the priority of the link $l_m$. This is because it is considered that when no clock pulse is detected at all, there is a possibility that the deterioration of the quality based on the reception power and the error rate of the synchronous signal in the step S101 shown in FIG. 3 cannot be detected.

Further, the control unit 12 of the switching device 10A may increase the priority of the link $l_m$ when the degree of difference (e.g., the value of the ratio) between the ratio of the change of the reception power included in the result of the reception of the test signal shown in FIG. 8, which has been received from the switching device 10B, and that of the transmission power is equal to or smaller than the threshold. This is because in the link $l_m$, the optical communication signal power is not adjusted by the relay device (e.g., the other switching device 10) on the transmission line, so that it is considered that it is the link through which faulty transmission is not delayed. Further, the control unit 12 of the switching device 10A may decrease the priority of the link $l_m$ in such a manner that the larger the degree of difference is, the more the control unit 12 decreases the priority of the link $l_m$. This is because it is considered that when the degree of difference is larger than the threshold, there is a possibility that the deterioration of the quality based on the reception power cannot be detected in the step S101 in FIG. 3.

<Hardware Configuration>

Figure 9:
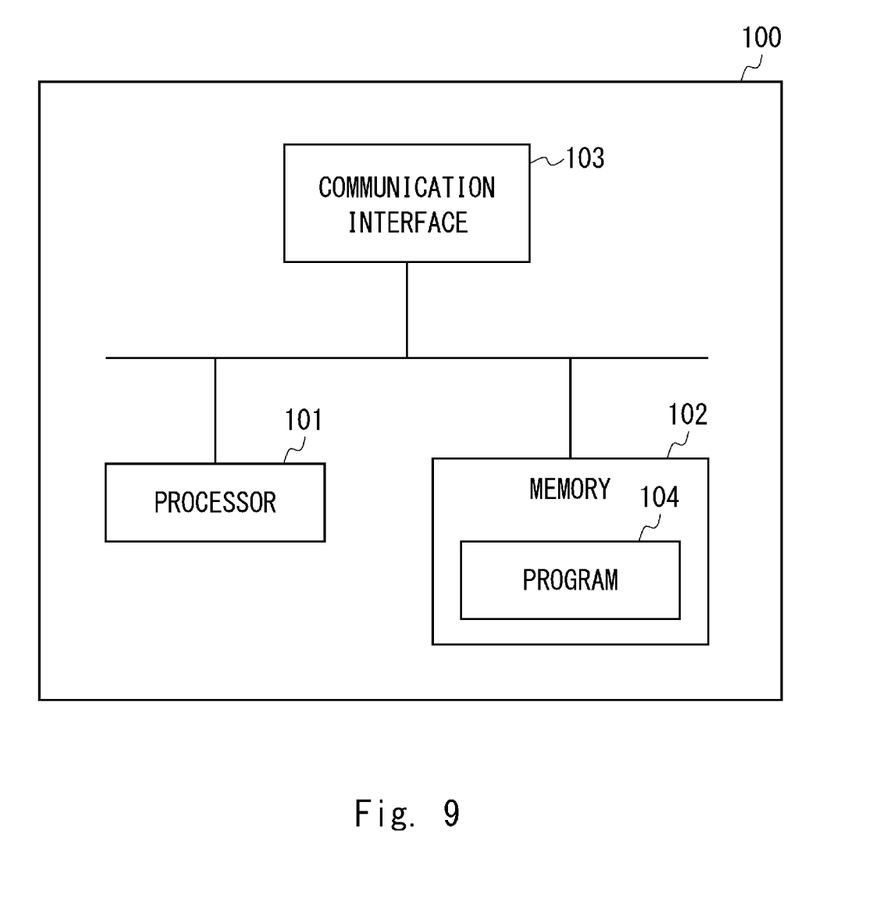
FIG. 9 shows an example of a hardware configuration of a switching device according to an example embodiment.

FIG. 9 shows an example of a hardware configuration of a switching device 10 according to an example embodiment. In the example shown in FIG. 9, the switching device 10 (a computer 100) includes a processor 101, a memory 102, and a communication interface 103. These components may be connected to each other through a bus or the like. The memory 102 stores at least a part of a program 104. The communication interface 103 includes an interface necessary for communicating with other network elements.

When the program 104 is executed through the cooperation of the processor 101, the memory 102, and the like, at least one of the processes of the example embodiment according to the present disclosure is performed by the computer 100. The memory 102 may be of any type suitable for a local technology network. The memory 102 may be, but is not limited to, a non-transitory computer readable storage medium. Further, the memory 102 may be implemented by using any suitable data storage technology such as a semiconductor-based memory device, a magnetic memory device and system, an optical memory device and system, a fixed memory, and a removable memory. Although only one memory 102 is provided in the computer 100, a plurality of physically different memory modules may be provided in the computer 100. The processor 101 may be of any type. The processor 101 may include at least one of a general-purpose computer, a dedicated computer, a microprocessor, a digital signal processor (DSP: Digital Signal Processor), and, as a non-limiting example, a processor based on a multi-core processor architecture. The computer 100 may include a plurality of processors, such as an application-specific integrated circuit chip that is temporally dependent on a clock for synchronizing the main processor.

An example embodiment according to the present disclosure may be implemented by hardware, a dedicated circuit, software, a logic, or any combination thereof. In some aspects, an example embodiment may be implemented by hardware, while in other aspects, an example embodiment may be implemented by firmware or software that may be executed by a controller, a microprocessor, or other computing devices.

The present disclosure also provides at least one computer program product that is tangibly stored in a non-transitory computer readable storage medium. The computer program product contains computer executable instructions, such as those contained in program modules, and is executed by a target real processor or by a device on a virtual processor, so that a process(es) or a method according to the present disclosure is performed. The program module contains routines, programs, libraries, objects, classes, components, and data structures for performing specific tasks or implement specific abstract data types. The functions of the program module may be combined with those of the other program modules, or divided into a plurality of program modules as desired in various example embodiments. The machine executable instructions in the program module can be executed locally or in a distributed device(s). In the distributed device, the program module can be disposed on both local and remote storage media.

The program codes for performing the method according to the present disclosure may be written in any combination of at least one programming language. These program codes are provided to a processor or a controller of a general-purpose computer, a dedicated computer, or other programmable data processors. These program codes are provided to a processor or a controller of a general-purpose computer, a dedicated computer, or other programmable data processing apparatuses, and when such a program code is executed by the processor or the controller, a function/operation in a flowchart and/or a block diagram to be implemented is executed. The program code is entirely executed in a machine, partially executed in a machine as a standalone software package, partially executed in a machine, partially executed in a remote machine, or entirely executed in a remote machine or a server.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

<Other Matters>

A case where when a problem related to the quality of an optical communication signal has occurred, a switching device 10 shuts down a link or notifies a user host 20 that the problem related to the quality of the optical communication signal has occurred. In this case, a delay $D_{legacy}$ until the switching device 10 completes the switching of the path includes a time $D_{opt}$ until the switching device 10 detects the problem, a processing time $D_{usr}$ until the switching device 10 shuts down the user-side line, a time $D_{rtr}$ until the switching device 10 detects the down of the link, and a processing time $D_{lag}$ until the switching device 10 switches the path. Note that the time $D_{opt}$ until the switching device 10 detects the problem includes a delay that is caused by the advanced modulation complex processing (QAM: Quadrature Amplitude Modulation, FEC: Forward Error Correction and the like) performed for the optical communication signal. Further, the delays $D_{opt}$ and $D_{rtr}$ also include a delay that is set for a link up/down operation (and is about 10 ms in most cases) in order to achieve a stable link operation. Therefore, the length of the time during which communication for a user stops increases. In contrast, according to the disclosed technology, when a problem has occurred in the quality of an optical communication signal, an optical communication path can be appropriately switched more quickly.

Modified Example

The switching device 10 may be a device included in one housing, but the switching device 10 according to the present disclosure is not limited to this example. The control unit 12 of the switching device 10 may be implemented by, for example, cloud computing composed of at least one computer. Further, the switching device 10 and the user host 20 may be constructed as an integrated device. Further, at least a part of processes performed by each of functional units of the switching device 10 may be performed by the user host 20. Such a switching device 10 is also included in an example of a "switching device" according to the present disclosure.

Each of the above-described example embodiments can be combined as desirable by one of ordinary skill in the art.

According to an aspect, it is possible to appropriately switch an optical communication path.

While the disclosure has been particularly shown and described with reference to example embodiments thereof, the disclosure is not limited to these example embodiments. It will be understood by those of ordinary skill in the art that various changes in form and details may be made therein without departing from the spirit and scope of the present disclosure as defined by the claims.

The whole or part of the example embodiments disclosed above can be described as, but not limited to, the following supplementary notes.

(Supplementary Note 1)

A switching device comprising:
an optical communication unit configured to receive an optical communication signal; and
a control unit configured to switch a path for the optical communication unit to receive an optical communication signal based on at least one of reception power of the optical communication signal received by the optical communication unit, an error rate of a synchronous signal therefor, an error rate after signal demodulation thereof, an error rate after error correction decoding thereof, and an SN (Signal-to-Noise) ratio of the path for the optical communication signal.

(Supplementary Note 2)

The switching device described in Supplementary note 1, wherein the control unit updates, based on an error rate obtained after error correction decoding of an optical communication signal received at a first time point, a reference value used to determine quality of an optical communication signal received at a second time point later than the first time point.

(Supplementary Note 3)

The switching device described in Supplementary note 1 or 2, wherein the optical communication unit transmits a test optical communication signal to another switching device and receives a result of reception of the test optical communication signal obtained in the other switching device, and the control unit determines a priority of a link with the other switching device based on the result of the reception of the test optical communication signal obtained in the other switching device.

(Supplementary Note 4)

The switching device described in Supplementary note 3, wherein the optical communication unit transmits, as the test optical communication signal, a cyclic signal in which a part of the signal is missing at at least one cycle to the other switching device, and receives, as the result of the reception of the test optical communication signal obtained in the other switching device, an optical signal indicating the number of times the reception of the cyclic signal was missing.

(Supplementary Note 5)

The switching device described in Supplementary note 3, wherein the optical communication unit transmits, as the test optical communication signal, a signal whose transmission power changes in a specific pattern to the other switching device, and receives, as the result of the reception of the test optical communication signal obtained in the other switching device, an optical signal indicating a change in the reception power.

(Supplementary Note 6)

The switching device described in Supplementary note 1 or 2, wherein the control unit determines a priority of each of a plurality of links having different modulation methods based on an error rate obtained after error correction decoding of the received optical communication signal.

(Supplementary Note 7)

A switching method comprising:
receiving an optical communication signal; and
switching a path for receiving an optical communication signal based on at least one of reception power of the received optical communication signal, an error rate of a synchronous signal therefor, an error rate after signal demodulation thereof, an error rate after error correction decoding thereof, and an SN (Signal-to-Noise) ratio of the path for the optical communication signal.

What is claimed is:

1. A switching device comprising:
an optical communication unit configured to receive an optical communication signal; and
a control unit configured to switch a path for the optical communication unit to receive an optical communication signal based on at least one of reception power of the optical communication signal received by the optical communication unit, an error rate of a synchronous signal therefor, an error rate after signal demodulation thereof, an error rate after error correction decoding thereof, and an SN (Signal-to-Noise) ratio of the path for the optical communication signal,
wherein the optical communication unit transmits a test optical communication signal to another switching device and receives a result of reception of the test optical communication signal obtained in the other switching device, and
the control unit determines a priority of a link with the other switching device based on the result of the reception of the test optical communication signal obtained in the other switching device.

2. The switching device according to claim 1, wherein the control unit updates, based on an error rate obtained after error correction decoding of an optical communication signal received at a first time point, a reference value used to determine quality of an optical communication signal received at a second time point later than the first time point.

3. The switching device according to claim 1, wherein the optical communication unit transmits, as the test optical communication signal, a cyclic signal in which a part of the signal is missing at at least one cycle to the other switching device, and receives, as the result of the reception of the test optical communication signal obtained in the other switching device, an optical signal indicating the number of times the reception of the cyclic signal was missing.

4. The switching device according to claim 1, wherein the optical communication unit transmits, as the test optical communication signal, a signal whose transmission power changes in a specific pattern to the other switching device, and receives, as the result of the reception of the test optical communication signal obtained in the other switching device, an optical signal indicating a change in the reception power.

5. A switching device comprising:

an optical communication unit configured to receive an optical communication signal; and a control unit configured to switch a path for the optical communication unit to receive an optical communication signal based on at least one of reception power of the optical communication signal received by the optical communication unit, an error rate of a synchronous signal therefor, an error rate after signal demodulation thereof, an error rate after error correction decoding thereof, and an SN (Signal-to-Noise) ratio of the path for the optical communication signal, wherein the control unit determines a priority of each of a plurality of links having different modulation methods based on an error rate obtained after error correction decoding of the received optical communication signal.

6. A switching method comprising:

receiving an optical communication signal; and switching a path for receiving an optical communication signal based on at least one of reception power of the received optical communication signal, an error rate of a synchronous signal therefor, an error rate after signal demodulation thereof, an error rate after error correction decoding thereof, and an SN (Signal-to-Noise) ratio of the path for the optical communication signal, wherein in the receiving of the optical communication signal, a test optical communication signal is transmitted to another switching device and a result of reception of the test optical communication signal obtained in the other switching device is received, and in the switching of the path, a priority of a link with the other switching device is determined based on the result of the reception of the test optical communication signal obtained in the other switching device.

* * * * *